Patented Jan. 28, 1936

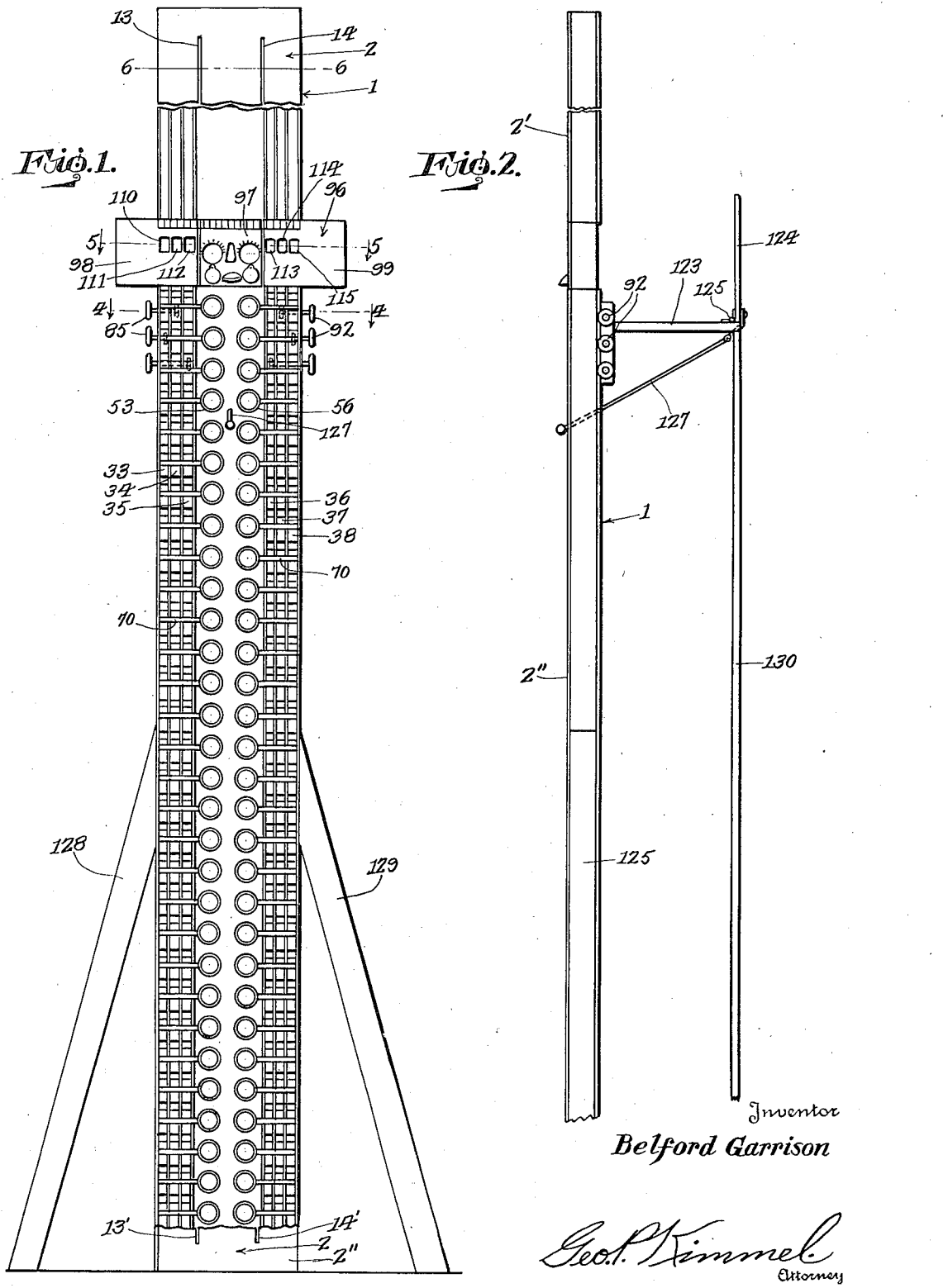

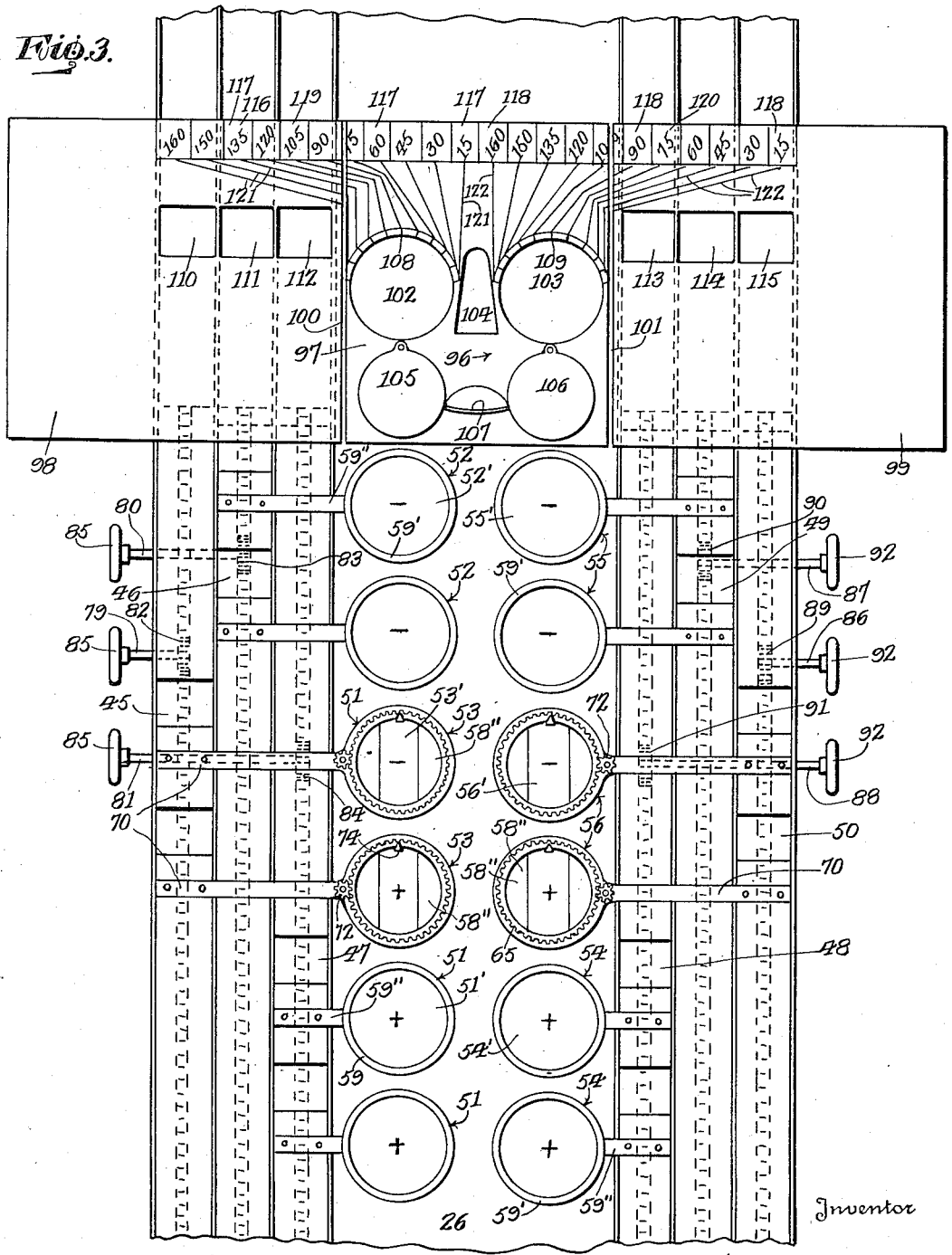

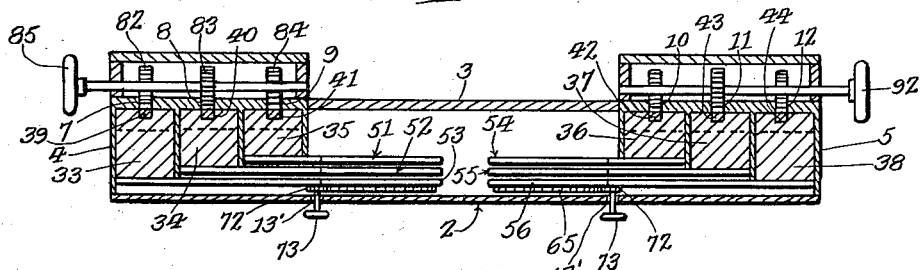
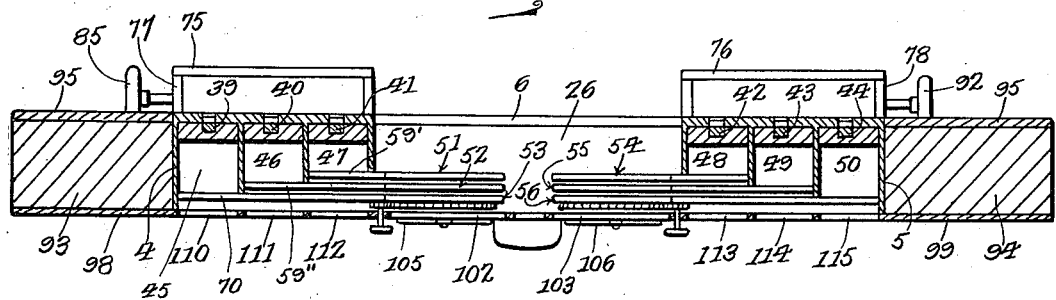
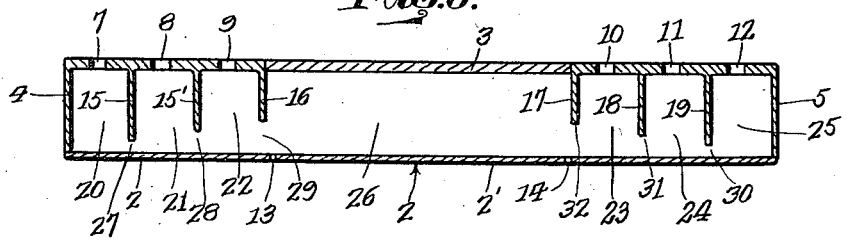
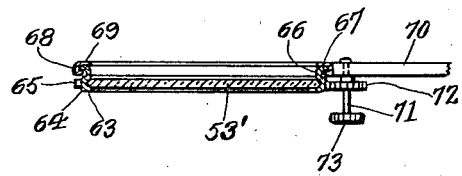

2,029,228

UNITED STATES PATENT OFFICE 2,029,228

EYE TESTING AND RECORDING APPARATUS

Belford Garrison, Cape May Court House, N. J.

Application May 1, 1935, Serial No. 19,288

3 Claims. (Cl. 88—22)

This invention relates to an eye testing and recording apparatus, and has for its object, to provide in a manner as hereinafter set forth, an apparatus of the class referred to whereby the lenses employed for testing the eyes, right or left, may be conveniently slid into and out of eye testing position until corrected vision is obtained, and further, whereby a removable record for a lens for corrected vision is visually set forth on the completion of the test.

Further objects of the invention are to provide, in a manner as hereinafter referred to, an eye testing and recording apparatus which is comparatively simple in its construction and arrangement, strong, durable, thoroughly efficient for the purpose intended thereby, conveniently operated, readily assembled, comparatively inexpensive to set up and of a form which will enable one to operate it and accurately test his own eyes and produce the record.

To the above ends essentially and to others which may hereinafter appear, the invention consists of such parts and such combination of parts which fall within the scope of the invention as claimed.

In the drawings:

Figure 1 is a front elevation of the apparatus with a portion of the front removed and with the lens carriers being conventionally shown, Figure 2 is a side elevation of the apparatus broken away at its lower end, Figure 3 is a fragmentary view, in front elevation, upon an enlarged scale of the apparatus, Figure 4 is a sectional plan on line 4—4, Figure 1, with the front of the apparatus in position.

Figure 5 is a sectional plan on line 5—5, Figure 1, through the instrument board with lenses positioned at the latter, Figure 6 is a section plan on line 6—6, Figure 1, Figure 7 illustrates, in elevation, the form of record cards, and Figure 8 is a diametrical sectional view showing the form of adjustable lens holder provided with a lens.

The apparatus includes an elongated upstanding housing 1 of rectangular contour in transverse cross section. The housing 1 is open at its top and includes a front wall 2, a back wall 3 and a pair of side walls 4, 5. The back wall 3 is cut away to form a rectangular opening 6 and two spaced parallel sets of spaced slots extending from points in proximity to its lower end to points at its upper edge. The number of the slots of each set is three. The slots of one set are designated 7, 8 and 9 and those of the other set 10, 11 and 12. The front wall 2 is set up from two spaced endwise opposed sections 2', 2''. The section 2' is formed with a pair of spaced parallel slots 13, 14 extending from each end of said section. The section 2'', which is the lower section of the front wall, is formed with a pair of spaced parallel slots 13', 14' extending from its upper end to a point in proximity to its lower end. The slots 13', 14' endwise align with the slots 13, 14. The slots 13, 13', 14, 14' are arranged between the lengthwise median of wall 2 and the side walls 4, 5. The front wall 2 has extending from its inner face two spaced parallel sets of spaced parallel guides coextensive therewith. The guides of each set are in the form of elongated webs or partitions progressively decreasing in width from the outer guide to the inner guide of the set. The inner lengthwise edges of the guides do not align. The guides of one set are designated 15, 15' and 16 and those of the other set 17, 18 and 19. The guides 16 and 19 are disposed on opposite sides of and spaced from the lengthwise median of wall 3. The guides are disposed in parallelism with respect to the walls 4, 5. The guide 15 coacts with wall 4 to form a passage 20; the guides 15, 15' coact to provide a passage 21; the guides 15', 16 coact to form a passage 22; the guides 19, 18 coact to provide a passage 23; the guides 18, 17 coact to form a passage 24 and the guide 19 coacts with the wall 5 to provide a passage 25. The guides 16 and 17 coact to provide a compartment 26. The passage 20 opens into passage 21, as at 27; the passage 21 opens into passage 22, as at 28 and the passage 22 opens into compartment 26, as at 29. The passage 25 opens into passage 24, as at 30; the passage 24 opens into passage 23, as at 31 and the passage 23 opens into the compartment 26, as at 32. The points of communication between the passages 22, 23 and the compartment 26 are coextensive with the length of said passages and compartment. The walls of the housing 1 are suitably secured together in a manner to permit access being had to the interior of the housing. The slots 7, 8 and 9 open into the compartments 15, 15' and 16 respectively. The slots 10, 11 and 12 open into the compartments 17, 18 and 19 respectively. The opening 6 opens into the compartment 26 at the back of the latter.

Slidably mounted in the passages 20, 21, 22, 23, 24, 25 are carriers 33, 34, 35, 36, 37, 38 respectively which snugly fit the side walls of said passage and are in the form of elongated bars of a length to extend from the top of front section 2'' to the bottom of the latter. The carriers 33, 38 are of the same cross sectional breadth, but greater than the cross sectional breadth of the carriers 34, 37. The carriers 34, 37 are of the same cross sectional breadth, but greater than the cross sectional breadth of carriers 35, 36. The carriers 35, 36 are of the same cross sectional breadth. The rear faces of the carriers oppose the inner face of the wall 3. The rear faces of carriers 33, 34, 35 are provided with racks 39, 40, 41 respectively which align with the openings 7, 8, 9 respectively. The rear faces of the carriers 36, 37, 38 are provided with racks 42, 43, 44 respectively which align with the openings 10, 11, 12 respectively. The length of the racks correspond to the length of the carriers. The fronts of carriers 33, 34, 35, 36, 37, 38 are provided with sets of thirty spaced pockets 45, 46, 47, 48, 49, 50 respectively, having the mouths thereof opening at the front face of the carriers.

The carriers 33, 34 and 35 are employed for positioning the testing lenses before and when testing the left eye of the patient. The carriers 36, 37 and 38 are employed for positioning the testing lenses before and when testing the right eye of the patient. The carriers 33, 34 and 35 have connected thereto sets of lens holders 51, 52, 53 respectively for the plus, minus and axis left eye testing lenses. The carriers 36, 37 and 38 have connected thereto sets of lens holders 54, 55 and 56 respectively for the plus, minus and axis right eye testing lenses. The number of holders of each set is thirty. Each holder has permanently secured therein a testing lens. The lenses in holders 51, 52, 53, 54, 55 and 56 are designated 51', 52', 53', 54', 55' and 56' respectively. The portions of the holders carrying the testing lenses are arranged in the compartment 26. The sets of holders 51, 52, 53 are oppositely disposed with respect to the sets of holders 54, 55, 56. The testing lenses of each set of plus lenses are from 0.25 to 20. Fifteen of the testing lenses of each set of axis lenses are from 0.25 to 6. (Minus) and the other fifteen of the testing lenses of each set of axis lenses are from 0.25 to 6. (plus). The testing lenses of each set of minus lenses are from 0.25 to 20. Each axis or cylinder lens is provided with a pair of oppositely disposed parallel red coatings 58" of segmental contour. The straight edges of the coatings oppose each other in spaced relation. The curved edges of the coatings are at the lens edge.

The sets of pockets 45, 46, 47 have arranged therein removable cards 57, 58, 59 respectively provided with plus, minus and axis lens indicia 60, 61, 62 respectively for designating the character of each testing lens carried by each of the holders 51, 52, 53 respectively for setting forth, in connection with indicia on cards, to be hereinafter referred to, the record for corrected vision after the completion of testing the left eye. The sets of pockets 48, 59, 50 have arranged therein removable cards similar to the cards 57, 58, 59 for the purpose of setting forth, in connection with indicia on cards, to be hereinafter referred to, the record for corrected vision after the completion of testing the right eye. The cards employed in connection with the left eye are designated "left" and those used with the right eye are designated "right".

Each lens holder for a plus and minus lens includes a lens carrying rim 59' and a stem 59". Each axis lens holder is adjustable and, with reference to Figure 8, it consists of a revoluble rim 63 in which the testing lens 58 is secured. The rim 63 has its outer edge 64 circumferentially toothed throughout, as at 65. The rim 63 is also formed at its front with an annular flange 66 of angle-shaped cross section which is mounted for revolving within an annular groove 67 formed in the inner face of an annular suspension member 68 provided with an inwardly extending retaining flange 69 to prevent separation between the member 68 and rim 63. Formed integral with one side of member 68 and projecting laterally therefrom is a stem 70 which is anchored directly upon the front face of a carrier. The stem 70, in proximity to member 68, has rotatably connected thereto a shaft 71 which carries a pinion 72 meshing with the teeth 65 of rim 63. Shaft 71 is provided at its outer end with a finger piece 73 to facilitate the rotation of the shaft when desired. The rim 63 carries a pointer 74 (Figure 3) for indicating the normal position of the lens 64. The arrangement referred to permits the adjusting of the lens in opposite directions to the extent of movement desired, or in other words provides for an adjustable testing lens.

The stems of the lens holders 51 are secured to carrier 33; those of holders 52 to carrier 34; those of holders 53 to carrier 35; those of the holders 54 to carrier 36; those of holders 55 to carrier 37 and those of holders 56 to carrier 38. The holders 51, 54 are arranged outwardly of the holders 52, 55 respectively. The holders 52, 55 are arranged outwardly of the holders 53, 56 respectively. The stems of the holders 52, 55 are of greater length than the stems of the holders 51, 55. The stems of the holders 53, 56 are of greater length than the stems of the holders 52, 55. The shafts 71 of the holders 53 travel in the slots 13, 13'. The shafts of the holders 56 travel in the slots 14, 14'.

The pockets 45, 46, 47, 48, 49, 50 are alternately disposed with respect to the stems of holders 51, 52, 53, 54, 55, 56 respectively. Each pocket is spaced from a holder stem. The indicia upon a card within a pocket leading a stem 70 associates with the lens in that holder to which such stem is connected.

Each carrier is independently shiftable with respect to anyone of the other of said carriers and for such purpose there is employed an independently operable means for each carrier. The said means will now be referred to. Secured to the back wall 3 of the housing 1 is a pair of spaced parallel rectangular housings 75, 76 having rear, top and bottom walls and a pair of end walls. The outer end walls of the housings 75, 76 are designated 77, 78 respectively. The end walls of the housings 75, 76 are secured directly to the back wall 3 of housing 1. Journaled in the end walls of housing 75 is a set of three superposed, spaced, parallel, rotatable shafts 79, 80 and 81 carrying pinions 82, 83, 84 respectively arranged in housing 75. The pinions 82, 83, 84 mesh respectively with the racks 39, 40 and 41. The shafts extend outwardly from end wall 77 and carry turning knobs 85 therefor. Journaled in the end walls of housing 76 is a set of three superposed spaced parallel rotatable shafts 86, 87, 88 carrying pinions 89, 90, 91 arranged in housing 76. The pinions 89, 90, 91 mesh respectively with the racks 44, 43, 42. The shafts 86, 87, 88 extend outwardly from end wall 77 and carry turning knobs 92 therefor. On the rotation of any one of the shafts it will coact with that rack with which it is associated, resulting in the shifting of a carrier.

Secured to the sides of housing 1 and extending laterally therefrom in opposite directions is a pair of supports 93, 94 having their rear faces provided with covers 95 flush with the outer face of rear wall 3. The front faces of the supports 93, 94 are flush with the forward edges of the side walls 4, 5 of housing 1 between the lower edge of section 2' and the upper edge of section 2'' of front wall 2. Secured to the front faces of supports 93, 94, to the housing 1 and extending from the outer end of support 93 to the outer end of support 94, as well as being positioned between the sections 2', 2'' of the front wall 2 of housing 1, is a rectangular testing board 96 formed of a central section 97 and a pair of end sections 98, 99. These latter are arranged in spaced relation relative to section 97 to provide a pair of openings 100, 101. The opening 100 registers with the slots 13, 13' to form continuations thereof. The opening 101 registers with slots 14, 14' to form continuations thereof.

The testing board section 97 is formed with a pair of spaced parallel left and right eye openings 102, 103 respectively having arranged therebetween a nose opening 104, closures 105, 106 for the openings 102, 103 respectively and a chin rest 107 below nose opening 104. The marginal portions of the outer face of section 97, which border the upper part of the openings 102, 103, are provided with sets of spaced graduations 108, 109 respectively. The openings 102, 103 align with and are spaced forwardly of opening 6.

The testing board section 98 is formed with a set of three parallel openings 110, 111, 112 for simultaneously exposing indicia carrying cards arranged respectively in one of the pockets 45, 46 and 47 whereby the said exposed cards will indicate the record of a lens for corrected vision for the left eye. The testing board section 99 is formed with a set of three parallel openings 113, 114, 115 for simultaneously exposing indicia carrying cards arranged respectively in one of the pockets 48, 49 and 50 whereby the said exposed cards will indicate the record for a lens for corrected vision for the right eye.

The board 96 is formed at its top with a row of boxes 116 for two sets 117, 118 of axis cards for the left and right eye respectively. The cards in the boxes are provided with permanently visible suitable axis indicating indicia. The indicia on the cards of the set 117 is indicated at 119 and that on the cards of the set 118 is indicated at 120. The board 96 is provided with spaced indicating lines 121 leading from the graduations of the set 108 to the cards of the set 117. The board 96 is also provided with a set of spaced indicating lines 122 leading from the graduations of the set 109 to the cards of the set 118.

Extending rearwardly from the back of housing 1, as well as being anchored to the latter below opening 6, is a plate 123 having a panel 124 hinged thereto, as at 125. The panel 124 is adapted to have a reading chart on its forward face. Attached to panel 124, as at 126, is an elevating and lowering means 127 therefor operated from the front of the apparatus.

The housing 1, at the lower portion of its sides, has anchored thereto a pair of upstanding oppositely extending inclined supports 128, 129. Secured to the rear of plate 123 is a vertically disposed support 130.

The board 96 coacts with the sections 2', 2'' of housing 1 to complete the front wall of compartment 26.

The chart which is adapted to be carried by the panel 124 is of the well known type employed in eye testing and it is formed with letters of different heights and a clock dial.

Before testing either the right or left eye, the carriers are in their lowermost position, and when using the apparatus to test for a distance lens for the right eye, the shaft 87 is operated to position the clearest lens 55' in front of the eye. Then shaft 86 is operated for the purpose of raising cylinder power, i. e., axis lenses 56' to successively oppose the said lens 55' until chart becomes clear, axis lens is then adjusted until the letters and clock dial appear normal to the eye and this would indicate the character of lens to be worn at all times. The exposed cards of carriers 37, 38 are then removed, as well as the card at the top of the board indicated by the line extended from pointer 74 on a holder 56. These cards are the prescription of the right eye for a distant lens. When testing the right eye the opening 102 is closed. When testing left eye the closure is removed from opening 102 and opening 103 is closed. The apparatus is operated from the left side thereof in the same manner as it is operated for testing in connection with the right eye.

When testing the right eye for reading glasses or bifocals, the opening 102 is closed; shaft 88 is operated until clearest lens 54' is brought to a position before the eye and shaft 86 then operates to successively elevate lenses 56' before the eye until that lens 56' of the desired power of cylinder opposes the eye and is then adjusted. The prescription will then be obtained from the exposed cards on the carriers and an axis card indicated by that line leading from the pointer. When testing left eye, the closure is removed from opening 2 and opening 3 is closed. The apparatus is operated from the left side thereof in the same manner as it is operated for testing in connection with the right eye.

What I claim is:

1. An eye testing and recording apparatus, a set of independent, vertically, selectively movable parallel carriers, a set of spaced edgewise superposed holders mounted upon one of the carriers for supporting minus testing lenses of different power for selective position before an eye being tested, a set of spaced edgewise superposed holders mounted upon another one of the carriers for supporting plus testing lenses of different power for selective position before an eye being tested, a set of spaced edgewise superposed holders mounted upon the other of said carriers for supporting axis testing lenses of different power for selective position before an eye being tested, said sets of holders being disposed in parallel paths, means for independently shifting each of said carriers, a stationary eye testing board provided with an eye opening and boxes adapted to receive removable axis indicia cards, each of said carriers provided with spaced means adapted to receive normally concealed removable cards carrying indicia for designating the power of the lenses supported by the set of holders mounted thereon, said board being formed with spaced card selecting means leading from that axis lens positioned at said opening to said boxes, and said board being provided with means for exposing cards in the carriers, on the completion of the test, to associate with a selected card in a box of the board to provide a lens prescription.

2. An eye testing and recording apparatus, a set of independent, vertically, selectively movable parallel carriers, a set of spaced edgewise superposed holders mounted upon one of the carriers for supporting minus testing lenses of different power for selective position before an eye being tested, a set of spaced edgewise superposed holders mounted upon another one of the carriers for supporting plus testing lenses of different power for selective position before an eye being tested, a set of spaced edgewise superposed holders mounted upon the other of said carriers for supporting axis testing lenses of different power for selective position before an eye being tested, said sets of holders being disposed in parallel paths, means for independently shifting each of said carriers, a stationary eye testing board provided with an eye opening and boxes adapted to receive removable axis indicia cards, each of said carriers provided with spaced means adapted to receive normally concealed removable cards carrying indicia for designating the power of the lenses supported by the set of holders mounted thereon, said board being formed with spaced card selecting means leading from that axis lens positioned at said opening to said boxes, said board being provided with means for exposing cards in the carriers, on the completion of the test, to associate with a selected card in a box of the board to provide a lens prescription, each of the holders for an axis lens being provided with means for revolubly adjusting the lens and a pointer bodily carried with the lens, said pointer being for coaction with said spaced card selecting means, and a supporting structure for said carriers and board having an opening intermediate its ends positioned rearwardly of said eye opening for the eye to view a chart.

3. An eye testing and recording apparatus, a set of independent, vertically, selectively movable parallel carriers, a set of spaced edgewise superposed holders mounted upon one of the carriers for supporting minus testing lenses of different power for selective position before an eye being tested, a set of spaced edgewise superposed holders mounted upon another one of the carriers for supporting plus testing lenses of different power for selective position before an eye being tested, a set of spaced edgewise superposed holders mounted upon the other of said carriers for supporting axis testing lenses of different power for selective position before an eye being tested, said sets of holders being disposed in parallel paths, means for independently shifting each of said carriers, a stationary eye testing board provided with an eye opening and boxes adapted to receive removable axis indicia cards, each of said carriers provided with spaced means adapted to receive normally concealed removable cards carrying indicia for designating the power of the lenses supported by the set of holders mounted thereon, said board being formed with spaced card selecting means leading from the axis lens positioned at said opening to said boxes, said board being provided with means for exposing cards in the carriers, on the completion of the test, to associate with a selected card in a box of the board to provide a lens prescription, each of the holders for an axis lens being provided with means for revolubly adjusting the lens and a pointer bodily carried with the lens, said pointer being for coaction with said spaced card selecting means, a supporting structure for said carriers and board having an opening intermediate its ends positioned rearwardly of said eye opening for the eye to view a chart, and an elevating and lowering chart carrying means for positioning the chart rearwardly of the opening in said supporting means, the said carrying means being supported from said supporting means.

BELFORD GARRISON.